2,926,164

N-(CHLOROPHENOTHIAZINEALKYL)-3 AND 4-(HYDROXY ALKYL)PIPERIDINES

John W. Cusic, Skokie, and Henry William Sause, Deerfield, Ill., assignors to G. D. Searle & Co., Chicago, Ill., a corporation of Delaware No Drawing. Application August 1, 1956
Serial No. 601,352

10 Claims. (Cl. 260—243)

The present invention relates to a new group of chlorophenothiazine derivatives and more particularly to N-(chlorophenothiazinealkyl) - 3 - and 4 - (hydroxyalkyl)-piperidines of the general structural formula

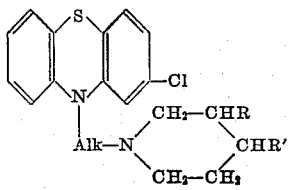

and the pharmaceutically acceptable non-toxic salts thereof wherein Alk is a lower alkylene radical and wherein one of the radicals R and R' is hydrogen and the other is a lower hydroxyalkyl radical.

In the foregoing structural formula Alk represents a bivalent saturated aliphatic hydrocarbon radical such as methylene, ethylene, propylene, butylene, pentylene, hexylene, trimethylene, tetramethylene, pentamethylene, and hexamethylene. The lower hydroxyalkyl radicals which R can represent can be, for example, hydroxymethyl, hydroxypropyl, hydroxybutyl and the like.

The piperidines depicted above form pharmaceutically acceptable salts with a variety of inorganic and strong organic acids including sulfuric, phosphoric, hydrochloric, hydrobromic, sulfamic, citric, ascorbic, and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The compounds of this invention provide ataractic and anti-emetic agents of a very high order of potency. It is particularly to be noted that the potency is of a much higher order than that of the corresponding unsubstituted piperidinoalkyl derivatives of 2-chlorophenothiazine. In addition these alcohols are valuable as intermediates in the synthesis of highly potent esters which are useful as central nervous depressants. Thus particularly good tranquilizing effect is obtained in the case of the acetates.

The compounds of this invention can be readily prepared by the treatment of a 2-chloro-10-(haloalkyl)-phenothiazine with a 3- or 4-hydroxyalkylpiperidine. Also, 2-chlorophenothiazine can be condensed with a N-(haloalkyl)-3 or 4-(hydroxyalkyl)piperidine.

The invention will appear more fully from the typical examples given below. However, the invention is not to be construed as limited thereby in spirit or in scope. Quantities of the agents are given as parts by weight.

Example 1

To a hot, stirred solution of 10.65 parts of 10-(γ-bromopropyl)-2-chlorophenothiazine in 80 parts of butanone are added 3 parts of sodium iodide and 8.3 parts of anhydrous potassium carbonate. Then a solution of 4.5 parts of 4-hydroxymenthylpiperidine hydrochloride in 25 parts of ethanol is added quickly. The mixture is heated at about 76° C. with stirring for 12 hours. Then most of the solvent is evaporated and the residue is extracted with ether. The ether solution is washed with water, dried over anhydrous potassium carbonate and then treated with a 25% solution of anhydrous hydrogen chloride in 2-propanol. The hydrochloride is collected on a filter, washed with ether and dissolved in water. The aqueous solution is filtered, rendered alkaline and extracted with ether. This ether extract is washed to neutrality with water, dried over anhydrous potassium carbonate, stirred with charcoal and filtered. The ether solution is repeatedly treated with hydrogen chloride in 2-propanol to precipitate the hydrochloride; the salt is collected on a filter, washed with ether and dissolved in water, and the aqueous solution is alkalinized with sodium carbonate solution and extracted with ether. There is thus obtained pure N-[γ-(2' - chloro - 10' - phenothiazine) - propyl] - 4 - (α-hydroxymethyl) piperidine.

Example 2

To a solution of 4.5 parts of 3-hydroxymethylpiperidine hydrochloride in 40 parts of ethanol are added 4.5 parts of sodium iodide and 8.4 parts of potassium carbonate in 80 parts of acetone. The solution is warmed to refluxing temperature and stirred while a solution of 10.65 parts of 10-(γ-bromopropyl)-2-chlorophenothiazine in 40 parts of acetone is run in slowly in the course of 30 minutes. The solution is stirred with refluxing for 10 hours. The mixture is then filtered and the filtrate is evaporated. The resulting residue is extracted with ether and the ether solution is washed with water, dried over anhydrous potassium carbonate and filtered. The filtrate is treated with a 25% solution of anhydrous hydrogen chloride in 2-propanol. The precipitate is dissolved in water and the solution is washed with ether, rendered alkaline with a 5% aqueous sodium carbonate solution, and extracted with ether. The ether solution is washed to neutrality and filtered. The filtrate is concentrated and dried. Treatment of the N-[γ-(2'-chloro-10'-phenothiazine)propyl]-3-(hydroxymethyl)piperidine with hydrogen chloride in 2-propanol yields a hydrochloride which softens at about 70° C. and melts at about 90° C.

Example 3

To a stirred and heated solution of 8.02 parts of 10-(γ-bromopropyl)-2-chlorophenothiazine in 45 parts of butanone are added 3.4 parts of sodium iodide and, 30 minutes later, 6.3 parts of potassium carbonate. Then 3.75 parts of 4-(β-hydroxyethyl)-piperidine hydrochloride in 12 parts of ethanol are added slowly. The resulting mixture is refluxed with stirring for 12 hours and then filtered. The filtrate is concentrated under vacuum and the residue is taken up in ether. The ether solution is washed with water, dried over sodium sulfate, filtered, and evaporated. The water is removed by azetropic distillation with benzene. The residue is diluted with ether and treated with hydrogen chloride in 2-propanol. The precipitate is separated from the solution, dissolved in 2-propanol and reprecipitated with dry ether. The salt is redissolved in 2-propanol and reprecipitated with ether and dried over phosphorus pentoxide. Further purification is achieved by repeated precipitation of the hydrochloride from ether after liberation of the base. The hydrochloride of N-[γ-(2'-chloro-10'-phenothiazine)propyl]-4-(β-hydroxyethyl) piperidine thus obtained softens at about 85–90° C. and melts at about 170–171° C.

Example 4

A solution of 6.2 parts of 10-(γ-chloropropyl)-2-chlorophenothiazine in 40 parts of butanone is treated with 3 parts of sodium iodide and stirred and refluxed for 2 hours. It is then cooled to room temperature and treated with 3 parts of 4-(γ-hydroxypropyl)piperidine in 20 parts of butanone and with 2.6 parts of potassium carbonate. The solution is stirred and refluxed for 10 hours, after which the solid is removed by filtration and the filtrate is concentrated under vacuum. The resulting residue is taken up in ether, filtered and precipitated by addition of hydrogen chloride in 2-propanol. The product is purified by repeated precipitation of the hydrochloride from the ether solution of the base. The hydrochloride of N-[γ-2′-chlorophenothiazine)propyl]-4-(γ-hydroxypropyl)piperidine thus obtained softens at about 90–100° C. and decomposes with gas formation at about 120–130° C.

Substitution of an equivalent amount of 10-(β-chloroethyl)-2-chlorophenothiazine for the γ-chloropropyl derivative and an equivalent amount of 3-(δ-hydroxybutyl)piperidine for the 4-(γ-hydroxypropyl)piperidine used in the above example yields N-[β-(2′-chlorophenothiazine)ethyl]-3-(δ-hydroxybutyl)piperidine. The hydrochloride decomposes with gas formation at about 130° C.

Example 5

To a solution of 7.3 parts of 10-(γ-chloropropyl)-2-chlorophenothiazine in 40 parts of butanone are added 3.5 parts of sodium iodide in 8 parts of butanone. The mixture is stirred and heated at near reflux temperature for 20 minutes, after which 3.3 parts of potassium carbonate are added. Then a solution of 3.37 parts of 3-(γ-hydroxypropyl)piperidine in 40 parts of butanone is permitted to run in quickly. Heating and stirring are continued for 12 hours. The mixture is filtered and the filtrate is evaporated. The residue is taken up in ether and water and the mixture is shaken. The ether solution is separated, washed with water, dried over anhydrous sodium sulfate and then dehydrated by azeotropic distillation with benzene. The resulting mixture is concentrated under vacuum and the residue is taken up in ether. The hydrochloride is precipitated with hydrogen chloride in 2-propanol. The base is repeatedly liberated by addition of dilute sodium hydroxide and the salt is reprecipitated with hydrogen chloride in 2-propanol. The hydrochloride thus obtained softens at about 90° C. and decomposes at about 120–130° C. with gas formation.

Example 6

To a solution of 5.55 parts of 4-(γ-acetoxypropyl)piperidine in 40 parts of butanone are added 1 part of potassium iodide and 4.2 parts of potassium carbonate. Then a butanone solution of 9.3 parts of 2-chloro-10-(γ-chloropropyl)phenothiazine is added with heating and stirring. Heating and stirring are continued for 12 hours, after which the mixture is cooled and filtered. The filtrate is concentrated and the residue is taken up in benzene, washed with water, dried, and treated with anhydrous hydrogen chloride in 2-propanol. Addition of dry ether causes formation of a precipitate which is then shaken with benzene and dilute aqueous sodium bicarbonate, washed to neutrality with water, dried over anhydrous potassium carbonate, filtered and evaporated. Treatment of an ether solution of this base with anhydrous hydrogen chloride in 2-propanol yields the hydrochloride of N-[γ-(2′-chlorophenothiazine)-propyl]-4-(γ-acetoxypropyl)piperidine which melts with decomposition at about 90° C.

This same compound is formed by the acetylation of N-[γ-2′-chlorophenothiazine)propyl]-4 - (γ - hydroxypropyl)piperidine.

Example 7

To a hot, stirred mixture of 4.3 parts of 4-(α-hydroxy-α-methylethyl)piperidine, 1 part of sodium iodide, 4.2 parts of anhydrous potassium carbonate, 20 parts of ethanol and 20 parts butanone a solution of 9.3 parts of 10-(γ-chloropropyl)-2-chlorophenothiazine in 20 parts of butanone and 20 parts of ethanol is added gradually. The mixture is heated at about 750° C. with stirring for 12 hours and then filtered. The filter cake is washed with butanone and the washings are combined with the filtrate. The solvent is evaporated and the residue is extracted with ether. The ether solution is washed with 5% aqueous sodium carbonate and then with water to neutrality, dried over anhydrous potassium carbonate and then treated with a 25% solution of anhydrous hydrogen chloride in 2-propanol. The hydrochloride is collected on a filter, washed with ether and dissolved in water. The aqueous solution is rendered alkaline and extracted with benzene. This extract is washed to neutrality with water, dried over anhydrous potassium carbonate, stirred with charcoal, filtered and evaporated. The residue is dissolved in ether. The ether solution of the base is repeatedly treated with hydrogen chloride in 2-propanol to precipitate the hydrochloride; the salt is collected on a filter, washed with ether and dissolved in water, and the aqueous solution is alkalinized with sodium carbonate solution and extracted with ether. There is thus obtained N-[γ-(2′-chloro-10′-phenothiazine)propyl] - 4 - (α-hydroxy-α-methylethyl)piperidine which softens at about 105° C. and melts at about 125–130° C. with gas formation. The base has the structural formula

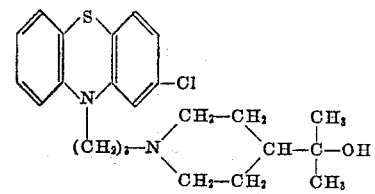

What is claimed is:

1. A compound of the structural formula

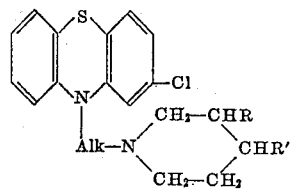

wherein Alk is a lower alkylene radical, wherein one of the radicals R and R' is hydrogen and the other is a lower hydroxyalkyl radical.

2. A compound of the structural formula

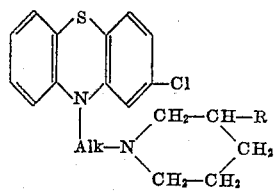

wherein Alk is a lower alkylene radical and R is a lower hydroxyalkyl radical.

3. A compound of the structural formula

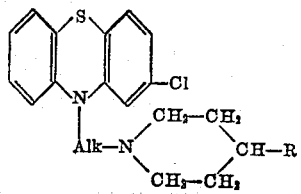

wherein Alk is a lower alkylene radical and R is a lower hydroxyalkyl radical.

4. A compound of the structural formula

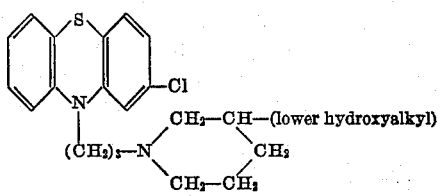

5. A compound of the structural formula

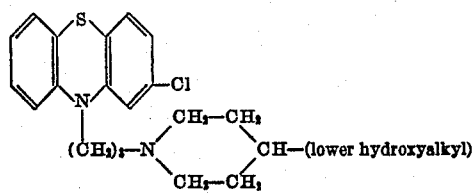

6. N-[γ-(2'-chloro - 10' - phenothiazine)propyl] - 3-(hydroxymethyl)piperidine.
7. N-[γ - (2' - chloro-10'-phenothiazine)propyl] - 4-(hydroxyethyl)piperidine.
8. N-[γ-2' - chloro - 10' - phenothiazine)propyl]-3-(hydroxypropyl)piperidine.
9. N-[γ - (2' - chloro - 10' - phenothiazine)propyl]-4-(hydroxymethyl)piperidine.
10. N-[γ-(2' - chloro - 10' - phenothiazine)propyl]-4-(hydroxypropyl)piperidine.

References Cited in the file of this patent
UNITED STATES PATENTS

| | | |
|---|---|---|
| 2,483,998 | Hunter et al. | Oct. 4, 1949 |
| 2,534,235 | Cusic | Dec. 19, 1950 |
| 2,534,237 | Cusic | Dec. 19, 1950 |
| 2,645,640 | Charpentier | July 14, 1953 |

UNITED STATES PATENT OFFICE

CERTIFICATE OF CORRECTION

Patent No. 2,926,164 February 23, 1960

John W. Cusic et al.

It is hereby certified that error appears in the printed specification of the above numbered patent requiring correction and that the said Letters Patent should read as corrected below.

Column 4, line 8, for "750° C." read -- 75° C. --.

Signed and sealed this 4th day of October 1960.

(SEAL)
Attest:

KARL H. AXLINE
Attesting Officer

ROBERT C. WATSON
Commissioner of Patents